United States Patent Office 3,726,804
Patented Apr. 10, 1973

3,726,804
PROCESS FOR THE PRODUCTION OF MICRO-
CAPSULES CONTAINING AN OILY LIQUID
Hiroharu Matsukawa and Masataka Kiritani, Fujinomiya, Japan, assignors to Fuji Photo Film Co., Ltd., Kanagawa, Japan
No Drawing. Filed Sept. 2, 1970, Ser. No. 69,177
Claims priority, application Japan, Sept. 2, 1969, 44/69,448
Int. Cl. B01j 13/02; B44d 1/02
U.S. Cl. 252—316                    26 Claims

ABSTRACT OF THE DISCLOSURE

A process for producing microcapsules containing an oily liquid which comprises dissolving at least one film-forming material which forms an oil and water insoluble high molecular weight material by reacting with itself or with another film-forming material in an oily liquid in the presence of a low boiling solvent or a polar solvent having miscibility with a polar liquid forming the continuous phase of the system, dispersing by emulsification the resulting solution in said polar liquid forming the continuous phase, and increasing the temperature of the system, whereby said film-forming materials in the dispersion are transferred to the surfaces of the oil drops and said reaction occurs to thereby form the high molecular weight material at the surfaces of the oil drops to form microcapsule walls. The film-forming material is selected from the group consisting of polyisocyanates, polyisothiocyanates, polyamines, polycarboxylic acids, polybasic chlorides, acid anhydrides, epoxy compounds, polyols, acrylate compounds, polysulfides, lactones, lactams and prepolymers thereof.

BACKGROUND OF THE INVENTION

Field of the invention

This invention relates to a process for the production of microcapsules containing an oily liquid. More particularly, it relates to a process for the production of oil-containing microcapsules having walls or shells of an oil-insoluble high molecular weight material and having grain sizes of from 0.2 millimicron to 500 microns.

Description of the prior art

Known processes for producing microcapsules containing a hydrophobic liquid are as follows:

(1) Phase separation from an aqueous solution (U.S. Pats. Nos. 2,800,457 and 2,800,458).

This process utilizes the coacervation of a hydrophilic colloid sol and has been the most generally and practically used.

(2) Interfacial polymerization (Japanese patent publication Nos. 19,574/'63; 446/'67; and 771/'67; British Pats. Nos. 989,264; 950,443; 867,797; 1,069,140 and 1,046,409).

According to these processes, a preliminarily polymerized material is not used as the capsular material. That is to say, a monomer, or an initial condensation product as a first film-forming material, is incorporated in an oily liquid to be encapsulated; a second film-forming material having a group or groups reactive with the first film-forming material is dissolved in a polar solvent immiscible with the above-mentioned oily liquid, and then the first film-forming material is reacted with the second film-forming material at the interface between the oil drops of the above-mentioned oily liquid and the polar solvent to form walls.

(3) Polymerization of a monomer in oil drops (Japanese patent publication No. 9,168/'61).

A compound having a double bond, such as an acrylic compound, styrene, vinyl acetate, etc., is dissolved in oil drops and the radical polymerization of the compound is carried out using a peroxide as a catalyst to form an oil-insoluble polymer at the surfaces of the oil drops.

(4) Melting, dispersing and cooling method (British Pats. Nos. 952,807 and 965,074).

A stable material which is in a solid state at ordinary temperature but which becomes liquid by heating, such as wax or a thermoplastic resin, is used as the capsular material for microcapsules.

(5) Spray drying method (U.S. Pat. No. 3,111,407 and British Pat. No. 930,422).

The principle of spray drying is utilized. An emulsified dispersion of solid particles or a liquid in a polymer solution is atomized by means of a spray dryer and at the instant when the dispersion is scattered through an atomizer as fine particles, the polymer encapsulates the content material.

However, these known processes have the following disadvantages.

Namely, the capsulation method (1) by coacervation is complicated in operation, the control of the size of the microcapsules produced or, in particular, the production of single particles of microcapsules is generally not easy, and the process is unstable because of the use of natural materials.

In the capsulation method (2) by interfacial polymerization, the kind of oily liquid to be used is limited by its dissolving power since one of the capsular materials is present in the oily material and also since the film-forming materials are left partially unreacted in the core material, which reduces the efficiency for the capsulation of the film-forming materials. Moreover, in this process a setting agent present in the continuous phase causes cross-linkage among capsules, which makes it difficult to produce separate microcapsules. Also, the physical strength and heat resistance of the walls of the capsules, which are the most important properties of the microcapsules, are low.

In method (3) by the polymerization of a monomer in oil drops, it is necessary to dissolve the monomer for forming walls of the capsules in the oily liquid to be encapsulated and hence the kinds of the oily liquid and the monomer are limited from the viewpoint of dissolving power or solubility. Furthermore, a prepolymer, etc., cannot be utilized in such a method since they have a low solubility in the oily liquid. Also, as the polymer is produced in the oil drops, the surfaces of the oil drops are not completely coated by the polymer walls and the encapsulated oily liquid slowly seeps from the defective portions or is evaporated away through such defective portions.

In the melting, dispersing and cooling method (4), a liquid material in a heated state is used and hence the heat resistance of the capsule walls produced is essentially low.

The spray drying method (5) is accompanied with such drawbacks that the scale of the apparatus becomes larger and the control of the size of microcapsules to be produced is difficult.

On the other hand, the process of this invention has the advantages that the size of the capsules can be easily controlled, the operation is simple, the physical strength and the heat resistance of the capsule walls are high, and the capsule walls can be effectively formed.

SUMMARY OF THE INVENTION

Briefly speaking, the present invention is carried out as follows: A first film-forming material and a second film-forming material which reacts with the first film-forming material to form a high molecular weight material are dissolved in an oily liquid in the presence of a low boiling solvent or polar solvent. When the solution is dispersed and emulsified in a polar liquid immiscible wth the above-mentioned oily liquid and then the temperature of the system is increased, the low-boiling solvent or the polar solvent is released from the oily liquid and the film-forming materials are transferred to the surfaces of the oil drops, where the reaction of forming the high molecular weight material proceeds at the surfaces of the drops and thereby oily liquid-containing microcapsules are formed.

DETAILED DESCRIPTION OF THE PREFERRED EMBODIMENTS

In the process of this invention, if the first film-forming material reacts to form the high molecular weight material by itself, the second film-forming material may be omitted. For the reaction forming the high molecular weight material in the present invention, a polyaddition reaction, a polycondensation reaction, a radical polymerization, or an ion polymerization reaction may be utilized; but a polyaddition reaction or a polycondensation reaction are most effective.

It is a feature of this invention that the first film-forming material and the second film-forming material are present in an oily liquid in the presence of a low-boiling solvent or a polar solvent, whereby the capsule walls can be effectively formed and also the thickness of the capsule walls can be desirably controlled. The purposes of using a low-boiling solvent or a polar solvent in the present invention are the oily liquid, to completely dissolve the first and second film-forming materials, is not limited by its dissolving power, and thus any desired hydrophobic oily liquid can be encapsulated and also that the low boiling solvent or the polar solvent is released into the aqueous phase as the temperature of the system is increased, whereby the film-forming materials in the oily liquid are transferred to the surface of the drops of the oily liquid and form capsule walls effectively.

It is desirable that the solubility of the first and second film-forming materials and the catalyst is low but if these components are soluble in the low boiling solvent or the polar solvent, they can be used in this invention.

As the film-forming materials in this invention, such compounds that react with each other to form a high molecular weight material insoluble in water and oil can be used. Examples of these compounds are polyisocyanates, polyisothiocyanates, polyamines, polycarboxylic acids, polybasic acid chlorides, acid anhydrides, epoxy compounds, polyols, acrylate compounds, polysulfides, lactones and lactams. Also, a prepolymer of the aforesaid compounds may be used as the film-forming material.

Moreover, a polyamide resin such as a polycondensation product of an aliphatic or aromatic polyamide and a dicarboxylic acid may also be used effectively in this invention.

Suitable examples of the film-forming materials which may be used in this invention are shown below:

As film-forming materials having isocyanate or thiocyanate groups, there are such diisocyanates as m-phenylenediisocyanate,
p-phenylenediisocyanate,
2,6-tolylenediisocyanate,
2,4-tolylenediisocyanate,
naphthalene-1,4-diisocyanate,
diphenylmethane-4,4'-diisocyanate,
3,3'-dimethoxy-4,4'-biphenyldiisocyanate,
3,3'-dimethyldiphenylmethane-4,4'-diisocyanate,
xylylene-1,4-diisocyanate,
xylylene-1,3-diisocyanate,
4,4'-diphenylpropane-diisocyanate,
trimethylenediisocyanate,
hexamethylenediisocyanate,
propylene-1,2-diisocyanate,
butylene-1,2-diisocyanate,
ethylidynediisocyanate,
cyclohexylene-1,2-diisocyanate,
cyclohexylene-1,4-diisocyanate,
p-phenylenediisocyanate,
cylylene-1,4-diisocyanate,
ethylidyne-diisocyanate, etc.;

such triisocyanates as 4,4',4''-triphenylmethanetriisocyanate, toluene - 2,4,6 - triisocyanate, polymethylenepolyphenyl isocyanate, etc.; such tetraisocyanates as 4,4'-dimethyldiphenylmethane-2,2',5,5'-tetraisocyanate; and such polyisocyanates as an addition product of hexamethylene diisocyanate and hexanetriol, an addition product of 2,4-tolylene diisocyanate and brenzcatechol, an addition product of tolylene diisocyanate and hexatriol, an addition product of tolylene diisocyanate and trimethylol propane, and an addition product of xylylenediisocyanate and trimethyl propane.

As examples of polyamines, there are aromatic polyamines such as o-phenylenediamine, p-phenylenediamine, 1,5-S-diaminonaphthalene, phthalamide, etc., and aliphatic polyamines such as N,N'-S-1,3-propylenediamine, N,N'-S-1,4-butylenediamine.

Also, as examples of polycarboxylic acids, there are pimelic acid, suberic acid, azelaic acid, sebacic acid, phthalic acid, terephthalic acid, 4,4'-biphenyl-dicarboxylic acid, 4,4'-sulfonyldibenzoic acid, etc.

As examples polybasic acid chlorides, there are terephthalic acid chloride, 1,5-naphthoic acid chloride, 4,4'-biphenyl-dicarboxylic acid chloride, and 4,4'-oxydibenzoic acid chloride.

Furthermore, as examples of acid anhydrides, there are dehydration condensates of two carboxylic acid or dicarboxylic acid molecules, such as maleic anhydride, succinic anhydride, phthalic anhydride, and benzoic anhydride.

Also, as examples of epoxy group-containing compounds, there are aliphatic glycidyl ethers such as diglycidyl ether, glycerine triglycidyl ether and polyallyl glycidyl ether having a molecular weight of 150–5000; aliphatic glycidyl esters such as diglycidyl ester of linolein dimer acid; aromatic glycidyl ethers such as diglycidyl ether of bisphenol A, triglycidyl ether of trihydroxyphenyl propane, and tetraglycidyl ether of tetraphenyleneethane; and glycidyl ether-ester mixtures such as diglycidyl ether ester of 4,4-bis(4-hydroxyphenyl)pentanoic acid.

As examples of polyols, there may be illustrated: aliphatic polyhydric alcohols, aromatic polyhydric alcohols, hydroxypolyesters and hydroxypolyalkylene ethers.

Examples of suitable polyhydric alcohols are catechol, resorcinol, hydroquinone, 1,2-dihydroxy-4-methylbenzene,
1,3-dihydroxy-5-methylbenzene,
3,4-dihydroxy-1-methylbenzene,
3,5-dihydroxy-1-methylbenzene,
2,4-dihydroxyethylbenzene,
1,3-naphthalene diol,
1,5-naphthalene diol,
2,7-naphthalene diol,
2,3-naphthalene diol,
o,o'-biphenol,
p,p'-biphenol,
1,1'-bi-2-naphthol,
bisphenol A,
2,2'-bis(4-hydroxyphenyl)butane,
2,2'-bis(4-hydroxyphenyl)-isopentane,
1,1'-bis(4-hydroxyphenyl)-cyclopentane,
1,1'-bis(4-hydroxyphenyl)-cyclohexane,
2.2'-bis(4-hydroxy-3-methylphenyl)-propane,
bis-(2-hydroxyphenyl)-methane,
xylylenediol,
ethyleneglycol,
1,3-propylene glycol,
1,4-butylene glycol,
1,5-pentane diol,
1,6-heptane diol, 1,7-heptane diol,
1,8-octanediol,
1,1,1-trimethylol propane,
hexanetriol, pentaerythritol, glycerol,
and sorbitol.

Also, derivatives of these aromatic or aliphatic polyhydric alcohols or polyhydric phenols, such as the compounds described in "Senryo and Yakuhin (Dyestuffs and Chemicals)"; 7, 4, 38–55 (1962) may be used in this invention.

The hydroxypolyester which may be used in this invention may prepared from a polycarboxylic acid and a polyhydric alcohol. As the polycarboxylic acid used for producing the hydroxypolyester, there are malonic acid, succinic acid, glutaric acid, adipic acid, pimelic acid, maleic acid, isophthalic acid, terephthalic acid, gluconic acid, etc. As the polyhydric alcohols, the above-mentioned polyhydric alcohols can be used.

The hydroxypolyalkylene ethers which may be used in this invention are a condensation product of, e.g., alkylene oxide and a polyhydric alcohol. As the alkylene oxide used for producing the hydroxypolyalkylene ether, there are ethylene oxide, propylene oxide, butylene oxide, and amylene oxide. The aforesaid polyhydric alcohols may be used as the alcohol component. Of course, other kinds of hydroxypolyalkylene ethers prepared by using other starting materials may be used, such as aralkylene oxide, e.g., tetrahydrofuran, an epihalohydrin such as epichlorohydrin, and styrene oxide.

A particularly useful hydroxypolyalkylene ether in this invention is one produced from an alkylene oxide having 3–6 carbon atoms and which has a high oleophilic property. Examples of this type poly-ethers are condensation products of polypropylene oxide or polybutylene oxide and glycol, glycerol, pentaerythritol, or sorbitol.

Also, a continuous addition product of an alkylenediamine (such as ethylenediamine) base alkylene oxide or a polyol which is a condensation product of the polyhydric alcohol may be effectively used in this invention.

For instance, there are N,N,N',N'-tetrakis(2-hydroxyethyl)-ethylenediamine and N,N,N',N' - tetrakis(2 - hydroxqpropyl)ethylenediamine.

As examples of polythiols, there are a condensation product of thioglycol and a reaction product of thioetherglycol and a polyhydric alcohol.

As examples of acrylate compounds there are cyanoacrylates such as methyl-α-cyanoacrylate, propyl-α-cyanoacrylate, and butyl-α-cyanoacrylate.

Examples of polyester acrylates are dimethacrylate-bis(ethyleneglycol)phthalate and the like.

Furthermore, as examples of polysulfides there are ones obtained by the reaction of dihalides and sodium sulfide. For example, the compound having the following structure

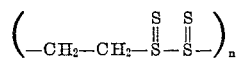

may be used.

As examples of lactone and lactam compounds, there are bis-α-angelica lactone, ε-caprolactam, η-capryl lactam, etc.

In the process of producing microcapsules according to the present invention, when a polyisocyanate, a polyisothiocyanate, a polyisocyanate pre-polymer or a polyisothiocyanate pre-polymer is used as the first film-forming material, the polyols, polyamines, polythiols, acid anhydrides, or epoxy compound described above are used as the second film-forming material.

When the polyamine is used as the first film-forming material, the polycarboxylic acids, polybasic acid chlorides, epoxy compounds, polyisocyanates or polyesters described above are used as the second film-forming material.

When the polycarboxylic acid is used as the first film-forming material, the polyisocyanates, polyisothiocyanates, polyisocyanate pre-polymers, polyisothiocyanate pre-polymers, polyamines, polythiols, or polyhydric alcohols described above are used as the second film-forming material.

Further, when the polybasic chloride is used as the first film-forming material, the polyamines, polyols or polythiols described above are used as the second film-forming material.

When the acid anhydride is used as the first film-forming material, the polyisocyanate, the polyisothiocyanate, the polyisocyanate prepolymer, the polyisothiocyanate prepolymer, the polyamine or the epoxy compound as described above is used as the second film-forming material.

Further, when the epoxy compound is used as the first film-forming material, the polyamide, the polyisocyanate, the polyisothiocyanate, the polyisocyanate prepolymer, the polyisothiocyanate prepolymer, the polysulfide, the acid anhydride, or the polycarboxylic acid as described above is used as the second film-forming material.

When the polyol is used as the first film-forming material, the polythiol, the polyisocyanate, the polyisothiocyanate, the polyisocyanate prepolymer, the polyisothiocyanate prepolymer, the polycarboxylic acid, the acid anhydride, or the polybasic acid chloride as described above is used as the second film-forming material.

Also, when the lactone or the lactam compound is used as the first film-forming material, the polyisocyanates, polyisothiocyanates, polyisocyanate prepolymers, polyisothiocyanate prepolymers, or polyamines described above are used as the second film-forming material.

The combination of the first film-forming material and the second film-forming material is determined by the heat resistance required in the capsular material.

Generally, the weight ratio of the first film-forming material to the second varies from 0.5:1 to 2:1; and the total amount of the first and second film-forming materials is more than 8 parts, by weight, per 100 parts, by weight, of the core material. The thickness of the capsule wall increases as the amount of film-forming materials increases.

For promoting the reaction of the first film-forming material with the second film-forming material, a catalyst may be used. As the catalyst, various compounds may be used and typical examples of the catalyst are as follows:

For instance, when the compound having an isocyanate group or an isothiocyanate group is used as the first film-forming material, the following known catalysts are used.

(1) Tertiary amines such as trimethylamine, triethylamine, N-methylmorpholine, N-ethylmorpholine, N,N-dimethylethanolamine, triethanolamine, N,N,N',N'-tetrakis-(2-hydroxypropylamine), and triethylenediamine.

(2) Organometallic compounds such as dibutyltin diacetate, dibutyltin dilaurate, dibutyltin laurate, dibutyltin maleate, dibutyltin laurate maleate, and dibutyltin-bis(6-methylaminocaproate) in which the tin may be changed to lead, zinc, cadmium, copper, chromium, nickel or cobalt.

(3) Tertiary phosphines such as trialkyl phosphine and dialkylbenzylphosphine.

(4) Salts of organic acids and various metals such as tin, lead, cobalt, nickel and copper, e.g., stannous octenoate, stannous oleate, lead octenoate, and cobalt naphthenate.

According to the process of this invention, the walls of the microcapsules are efficiently and uniformly formed by the action of the solvent and also the thickness and the strength of the walls can be desirably controlled by varying the kind and the amount of the film-forming materials.

As the hydrophobic oily liquid to be employed as the core material of the microcapsules, a natural oil, a synthetic oil and a solvent having a mild or high boiling point may be used. For instance, there may be illustrated: paraffin oil, cotton seed oil, soybean oil, corn oil, olive oil, castor oil, fish oil, lard oil, chlorinated paraffins, chlorinated diphenyl, dibutyl phthalate, dioctyl phthalate, tributyl phosphate, tricresyl phosphate, dibutyl maleate, o-dichlorobenzene, and benzyl alcohol.

The low boiling point solvent used in this invention preferably has a boiling point lower than that of the polar liquid forming the continuous phase but is required to be a good solvent for the first and the second film-forming materials and have a good miscibility with the oily liquid. Instead of the low boiling solvent, a polar solvent may be used.

It is necessary that the polar solvent be a good solvent for the first and second film-forming materials and have a good miscibility with the oily liquid and that it be soluble in the polar liquid which forms the continuous phase. The boiling point of the polar solvent may be higher than that of the polar liquid for forming the continuous phase.

The polar solvent improves the miscibility of the first and second film-forming materials with the oily liquid and when the polar solvent is released into the polar liquid forming the continuous phase at the increase of temperature, the film-forming materials are transferred to the surface of the oil drops, whereby uniform microcapsules are formed.

In the process of this invention, the low boiling solvent or the polar solvent is released in the polar liquid forming the continuous system at the formation of the capsules and scarcely remains in the capsules.

As the low boiling solvent, there may be used n-pentane, methylene chloride, ethylene chloride, carbon disulfide, acetone, methyl acetate, chloroform, n-hexane, methyl alcohol, tetrahydrofuran, carbon tetrachloride, ethyl acetate, ethyl alcohol, methyl ethyl ketone, benzene, ethyl ether and petroleum ether either alone or as mixtures thereof.

Also, as the polar solvent, there are used dioxane, cyclohexanone, methyl isobutyl ketone, and dimethyl formamide.

A typical example of the polar liquid forming the continuous phase is water; but ethylene glycol, glycerol, butyl alcohol, octyl alcohol, etc., can also be used in this invention.

The oily liquid to be encapsulated is dispersed by emulsification in the polar liquid using a protective colloid or a surface active agent. As the protective colloid, there are natural or synthetic hydrophilic high molecular weight materials such as gelatin, gum arabic, casein, carboxymethyl cellulose, starch, and polyvinyl alcohol.

As the surface active agent, there may be used either anionic surface-active agents such as an alkylbenzene sulfonate, an alkylnaphthalene sulfonate, a polyoxyethylene sulfate, and Turkey red oil or non-ionic surface active agents such as polyoxyethylene alkyl ether, a polyoxyethylene alkylphenol ether, and a sorbitol fatty acid ester.

The amount of the film-forming materials is determined by the amount of the core material to be encapsulated and the desired thickness of the walls of the capsules.

The amount of the catalyst used to promote the reaction of the first film-forming material and the second-film-forming material is as small as about 0.01 to 5%, by weight, based on the weight of film-forming materials.

In the process of this invention, the film-forming materials are all present in the oily liquid to be encapsulated and when the temperature of the system is increased to greater than 40° C., preferably greater than 60° C., they are effectively and uniformly deposited from the oil drops onto the surfaces of the oil drops to form walls of a high molecular weight material. Therefore, the microcapsule prepared by the process of this invention is a uniform and single particle.

Therefore, the present process is different from a conventional method of phase separation from aqueous solution such as the coacervation method, in that the concentration of colloid, the pH of the system, and the agitation rate are not factors for forming the microcapsules in the process of this invention, and microcapsules having uniform walls showing high physical strength and high heat resistance are obtained in the process of this invention as compared with a conventional interfacial polymerization method.

Further, the present process is different from the conventional method of polymerizing a monomer in oil drops as disclosed in Japanese patent publication No. 9,168/'61 in that the selection of the film-forming materials and the oily liquid to be encapsulated are not limited by their dissolving power in the process of this invention. Furthermore, since the capsules prepared by the process of this invention are completely covered by the walls, the encapsulated oily liquid does not diffuse out or evaporate, and are thus different from the capsules produced by the process disclosed in Japanese patent publication No. 9,168/'61 (discussed above). Further, the heat resistance and the physical strength of the microcapsules prepared by the process of this invention are very high.

The present invention will be further explained by reference to the following examples which are merely illustrative and not limiting in nature.

EXAMPLE 1

3 g. of bisphenol A was dissolved in 10 g. of a solvent mixture of acetone and methylene chloride (1:3 by weight). The resulting solution was added to 30 g. of chlorinated diphenyl as the core material to form a primary solution. Thereafter 4 g. of tolylene diisocyanate and 0.05 g. of dibutyltin laurate as a catalyst were added to the solution to form a secondary solution.

These solutions were prepared at temperatures lower than 25° C.

The secondary solution prepared above was slowly added with vigorous stirring to a solution of 5 g. of gum arabic in 20 g. of water, whereby an oil drop-in-water-type emulsion having oil drops of 5–10 microns in average size was formed. In this case, the above procedure was conducted while cooling the vessel so that the temperature of the system was not increased over 20° C. If the temperature of the system during the emulsification was higher than the boiling point of methylene chloride, i.e., 40° C., capsulation would begin to give capsules having uneven sizes.

When the emulsification was finished, 100 g. of water at 40° C. was added to the emulsion with stirring. Thereafter, the temperature of the system was gradually increased to 90° C. over a period of 30 minutes. The system was maintained at 90° C. for 20 minutes with stirring to complete the capsulation. By the results, microcapsules containing chlorinated diphenyl were obtained.

If it is desired to recover the microcapsules as a powder, they could be directly obtained by means of a spray dryer. The properties of the microcapsules thus obtained were compared with the microcapsules prepared by the process shown in the example of the Japanese patent publication No. 9,168/'61 and the microcapsules prepared by the interfacial polymerization method of Japanese patent publication No. 446/'67, the results being shown in the following table.

| Method | Patent No. 9,168/'61 | Patent No. 446/'67 | Present invention |
|---|---|---|---|
| Strength | 2 kg./cm.$^2$ | 4 kg./cm.$^2$ | 10 kg./cm.$^2$ |
| Heat resistance | Completely broken after 1 hour. | Broken partially after 5 hours. | Unchanged for 5 days. |
| Solvent resistance. | Partially diffused. | Unchanged. | Unchanged. |

The test procedures employed in the above tests were as follows:

Capsule strength test: the microcapsules were placed on a glass plate and pressed and the point of breakage determined.

Heat resistance test: dried microcapsules were placed in a drying box at 110° C.

Solvent resistance test: microcapsules were immersed in toluene for 1 day.

EXAMPLE 2

3 g. of o,o'-biphenyl was dissolved in 10 g. of tetrahydrofuran. The solution was added to 30 g. of chlorinated paraffin as the core material to give a primary solution. Then, 7 g. of xylylene diisocyanate and 0.02 g. of N-methyl morpholine as a catalyst were added to the primary solution to form a secondary solution.

By treating the solution thus obtained by the same procedure as in Example 1, microcapsules containing chlorinated paraffin were obtained.

EXAMPLE 3

4 g. of 1,4-naphthalene diol was dissolved in 12 g. of tetrahydrofuran and the solution was added to 25 g. of an oily liquid consisting of 3 parts by weight of chlorinated diphenyl and 1 part by weight of liquid paraffin to form a primary solution. Then 6 g. of diphenylmethane-4,4'-diisocyanate and 0.05 g. of N-ethyl morpholin as a catalyst were added to the primary solution to form a secondary solution.

Apart from this, 3 g. of polyvinyl alcohol having a saponification degree of 700 was dissolved in 20 g. of water at 70° C. and then the solution was cooled to 20° C.

While vigorously stirring the above polyvinyl alcohol solution, the secondary solution was gradually added thereto, whereby an oil drop-in-water-type emulsion having oil drops of 20–30 microns in average size was formed. This procedure was conducted while cooling the vessel so that the temperature of the system was not over 30° C. After the emulsification was finished, the stirring was weakened and 70 g. of water at 70° C. was added thereto and the temperature of the system was increased to 90° C. over a period of 10 minutes. The system was maintained at the temperature with stirring whereby microcapsules containing chlorinated diphenyl and liquid paraffin were obtained.

EXAMPLE 4

4 g. of 4,4'-dihydroxy-diphenylsulfone was dissolved in 15 g. of tetrahydrofuran and the solution was mixed with 20 g. of olive oil as the core material to give a primary solution. Then, 6 g. of xylylene diisocyanate and 0.1 g. of dibutyltin maleate as a catalyst were added to the solution to give a secondary solution. This procedure was conducted at temperatures lower than 20° C.

The secondary solution was added gradually to a solution of 4 g. of gum arabic in 20 g. of water of 15° C. with vigorous stirring, whereby an oil drop-in-water-type emulsion containing oil drops of 1–2 microns in average size was obtained.

During the emulsification procedure, the vessel was cooled so that the temperature of the system was not over 20° C.

Thereafter, 70 g. of water at 50° C. was poured in the emulsion with stirring and the temperature of the system was gradually increased to 90° C. over a period of 30 minutes. The system was maintained at the same temperature for 60 minutes. Microcapsules having encapsulated therein olive oil were obtained.

EXAMPLE 5

6 g. of glycerol-base polyoxypropylene ether having a trifunctional group was dissolved in 20 g. of methylene chloride. The solution was mixed with 20 g. of dioctyl phthalate as a core material to give a primary solution. Then, 5 g. of the diphenylmethane diisocyanate type polyisocyanate represented by the following formula,

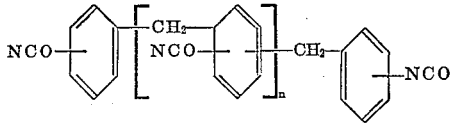

wherein $n$ is an integer of 0 to 3, and 0.1 g. of tripropylamine as a catalyst were added to the primary solution to give a secondary solution.

The secondary solution was added dropwise to a solution of 4 g. of gum arabic and 0.5 g. of Turkey red oil in 20 g. of water at 15° C. with vigorous stirring, whereby an oil drop-in-water-type emulsion having oil drops having a size of 10 to 15 microns was formed. After the emulsification was finished, 100 g. of water at 60° C. was poured into the emulsion with stirring and then the temperature of the system was increased to 95° C. The system was maintained at the same temperature for 60 minutes, whereby microcapsules containing dioctyl phthalate were obtained.

EXAMPLE 6

4 g. of trimethylol propane-base polyoxypropylene ether having a trifunctional group (average molecular weight 1000) was dissolved in 8 g. of methylene chloride and the solution was mixed with 30 g. of chlorinated diphenyl as core material to give a primary solution. Then, 4 g. of polyisocyanate consisting of 2,4-tolylene diisocyanate and 2,6-tolylene diisocyanate (80:20 by weight) and 0.1 g. of dibutyltin laurate maleate as a catalyst were added to the mixture to give a secondary solution. The above procedures were conducted at temperatures lower than 20° C.

By treating the solution thus obtained as in Example 5, microcapsules containing chlorinated diphenyl were obtained.

EXAMPLE 7

By repeating the same procedure as in Example 6, except that 3 g. of a sorbitol-base polyoxypropylene hexanol was used as the polyoxypropylene polyol, microcapsules containing chlorinated diphenyl were obtained.

EXAMPLE 8

By repeating the same procedure as in Example 6, except that 4.5 g. of Tetronic 70.1 of Koniol TMP–1000 (trade name, an ethylene diamine base continuous addition product of propylene oxide and ethylene oxide made by Wyandove Chemicals Co., content of ethylene oxide 10–19%, and average molecular weight about 3000) was used, microcapsules containing chlorinated diphenyl were obtained.

EXAMPLE 9

4 g. of a hydroxypolyester having an OH value of 300, Desmophen 800 (trade name, made by Bayer AG) (the polyester consisting of a composition of adipic acid, phthalic anhydride, and trimethylol propane), was dissolved in 12 g. of methylene chloride. The solution was mixed with chlorinated diphenyl to give a primary solution. Then, 6 g. of xylylene diisocyanate and 0.1 g. of dioctyltin maleate as a catalyst were added to the primary solution to give a secondary solution.

By treating the solution as in Example 5, microcapsules containing chlorinated diphenyl were obtained.

EXAMPLE 10

2.0 g. of a commercially available glycidyl polyether having an epoxy equivalent of 198, Epikote 828 (trade name, made by Shell Research Ltd.) was dissolved in 15 g. of tetrahydrofuran and the solution was mixed with 20 g. of chlorinated diphenyl to give a primary solution. Then, 4.0 g. of an addition product of tolylene diisocyanate and trimethylol, Desmodur L (trade name, made by Farbenfabriken Bayer) and 0.1 g. of a catalyst, dibutyltin maleate, were added to the solution to give a secondary solution.

By treating the solution as in Example 5, microcapsules containing chlorinated diphenyl were obtained.

EXAMPLE 11

4 g. of polysulfide resin, Thiokol Lp-2 (trade name, made by Thiokol Chemical Corp.) as a polyol was dissolved in 10 g. of methylene chloride and the solution was mixed with 30 g. of chlorinated diphenyl to provide a primary solution. Then, 6 g. of diphenylmethane-4,4'-diisocyanate and 0.05 g. of a catalyst, N,N-dimethylbenzylamine, were added to the mixture to give a secondary solution.

By treating the solution as in Example 5, microcapsules containing chlorinated diphenyl were obtained.

EXAMPLE 12

5 g. of phthalic anhydride was dissolved in 15 g. of a solvent mixture of methylene chloride and acetone (2:1 by weight) and the solution was mixed with 20 g. of chlorinated diphenyl as the core material to give a primary soltuion. Then, 6 g. of xylene-1,4-diisothiocyanate and 0.05 g. of a catalyst, N-ethylmorpholin were added to the solution to give a secondary solution.

Thereafter, by treating the soluiton in Example 5, microcapsules containing chlorinated diphenyl were obtained.

EXAMPLE 13

4 g. of phthalic anhydride and 6.0 g. of a commercially available glycidyl polyether having an epoxy equivalent of 305, Epikote 864 (trade name, Shell Chemical Co.) were dissolved in 20 g. of acetone and the solution was mixed with 20 g. of chlorinated diphenyl. Then, the solution was added with vigorous stirring to an aqueous solution consisting of 4 g. of a commercially available polyvinyl alcohol having a saponification degree of 80% and a polymerization degree of about 500, PVA 205 (trade name, made by Kurashiki Rayon K.K.) and 20 g. of water, whereby an oil drop-in-water-type emulsion containing oil drops having sizes of 10–15 microns was obtained. While stirring the system, 50 g. of water at 60° C. was added thereto, and then the temperature of the system was increased to 95° C. and the system was maintained at the same temperature for 2 hours. As a result, microcapsules of a high molecular weight material containing chlorinated diphenyl were obtained.

EXAMPLE 14

5 g. of 4,4'-diphenyldicarbonyl chloride was dissolved in 25 g. of chlorided diphenyl to provide a primary solution and then the resultant solution was mixed with a solution of 4 g. of 1,5-S-diaminonaphthalene and 2.5 g. of octamethylenediamine in 20 g. of benzene at temperatures of lower than 10° C. to provide a secondary solution.

Wtih vigorous stirring, the secondary solution prepared above was added to a solution of 5 g. of gum arabic in 20 g. of water to form an oil drop-in-water-type emulsion.

Thereafter, 100 g. of hot water was added to the emulsion with stirring and the temperature of the system was increased to 90–100° C., and then the system was maintained at that temperature for 60 minutes. By this procedure, micro-capsules of a high molecular weight material containing chlorided diphenyl were obtained.

EXAMPLE 15

By repeating the same procedure as in Example 10, except that 20 g. of dimethyl formamide was used instead of 15 g. of tetrahydrofuran and 20 g. of chlorinated paraffin was used instead of 20 g. of chlorinated diphenyl, microcapsules containing chlorinated paraffin and having a heat resistance above 110° C. were attained.

What is claimed is:

1. In a process for producing microcapsules containing an oily hydrophobic liquid comprising:

(1) dissolving at least one film-forming material which forms an oil and water insoluble high molecular weight material by reaction by itself or with another film-forming material in an oily hydrophobic liquid to be encapsulated, said film-forming material being selected from the group consisting of polyisocyanates, polyisothiocyanates, polyamines, polycarboxylic acids, polybasic chlorides, acid anhydrides, epoxy compounds, polyols, acrylate compounds, polysulfides, lactones, lactams and prepolymers thereof;

(2) dispersing, by emulsification, the resulting solution in a polar liquid forming a dispersion wherein the oily hydrophobic liquid is dispersed in the form of droplets in the polar liquid which forms the continuous phase of the dispersion; and (3) increasing the temperature of the dispersion wherein the film-forming material in the dispersion is transferred to the surfaces of the droplets of the oily hydrophobic liquid whereby said reaction occurs to thereby form the oil and water insoluble high molecular weight material at the surfaces of the oil droplets thereby forming the microcapsule walls;

the improvement comprising said dissolving being conducted in the presence of a non-oily low boiling solvent or a non-oily polar solvent, both solvents being different from said oily hydrophobic liquid, said non-oily low boiling solvent or said non-oily polar solvent being released into the polar liquid forming the continuous phase of the dispersion during step (3) resulting in the formation of said oil and water insoluble high molecular weight material microcapsule walls, wherein said non-oily low boiling solvent is a solvent for said film-forming material, is miscible with said oily hydrophobic liquid, and is different from said polar liquid;

wherein said non-oily polar solvent is a solvent for said film-forming material, is miscible with said oily hydrophobic liquid, is soluble in said polar liquid, and is different from said polar liquid; and wherein said polar liquid forming the continuous phase of the dispersion is immiscible with said oily hydrophobic liquid.

2. The process as in claim 1, wherein said filmforming material is a polyamide resin.

3. The process as in claim 1, wherein said oily liquid is paraffin oil, cotton seed oil, soybean oil, corn oil, olive oil, castor oil, fish oil, lard oil, chlorinated paraffin, chlorinated diphenyl, dibutyl phthalate, dioctyl phthalate, tributyl phosphate, tricresyl phosphate, dibutyl maleate, o-dichlorobenzene or benzyl alcohol.

4. The process as in claim 1, wherein said non-oily low boiling solvent is n-pentane, methylene chloride, ethylene chloride, carbon disulfide, acetone, methyl acetate, chloroform, methyl alcohol, tetrahydrofuran, n-hexane, carbon tetrachloride, ethyl acetate, ethyl alcohol, methyl ethyl ketone, benzene, ethyl ether, petroleum ether or mixtures thereof.

5. The process as in claim 1, wherein said non-oily polar solvent is dioxane, cyclohexanone, methyl isobutyl ketone or dimethyl formamide.

6. The process as in claim 1, wherein said polar liquid forming the continuous phase of the dispersion is water.

7. The process as in claim 1, wherein said polar liquid forming continuous phase of the dispersion is ethylene glycol, glycerol, butyl alcohol or actyl alcohol.

8. The process as in claim 1, wherein said dispersing is conducted using a protective colloid or a surface active agent.

9. The process as in claim 8, wherein said protective colloid is gelatin, gum arabic, casein, carboxymethyl cellulose, starch or polyvinyl alcohol.

10. The process as in claim 8, wherein said surface active agent is alkylbenzene sulfonate, alkylnaphthalene sulfonate, polyoxyethylene sulfate, Turkey red oil, polyoxyethylene alkyl ether, polyoxyethylene alkyl phenol or sorbitol fatty acid ester.

11. The process as in claim 1, wherein the reaction of said film-forming material is conducted in the presence of from 0.01 to 5% by weight based on the weight of film-forming materials of a catalyst.

12. The process as in claim 11, wherein said catalyst is a tertiary amine, an organo metallic compound, a tertiary phosphine or a salt of a metal.

13. The process as in claim 1, wherein the temperature of the dispersion is raised to at least 40° C.

14. The process as in claim 1 wherein the total amount of film-forming material is at least 8 parts by weight per 100 parts by weight of said oily hydrophobic liquid.

15. In a process for producing microcapsules containing an oily hydrophobic liquid comprising:
   (1) dissolving at least two film-forming materials which react to form an oil- and water-insoluble high molecular weight material in an oily hydrophobic liquid to be encapsulated, said film-forming materials being selected from the group consisting of polyisocyanates, polyisothiocyanates, polyamines, polycarboxylic acids, polybasic chlorides, acid anhydrides, epoxy compounds, polyols, acrylate compounds, polysulfides, lactones, lactams and prepolymers thereof, wherein the weight ratio of the first to the second film-forming material varies from 0.5:1 to 2:1, and wherein the total amount of the first and second film-forming materials is at least 8 parts by weight per 100 parts by weight of said oily hydrophobic liquid;
   (2) dispersing, by emulsification, the resulting solution in water which forms the continuous phase of the dispersion wherein the oily hydrophobic liquid is dispersed in the form of droplets in the water; and
   (3) increasing the temperature of the dispersion to at least 40° C. wherein the film-forming materials in the dispersion are transferred to the surfaces of the droplets of the oily hydrophobic liquid whereby said reaction occurs to thereby form the oil- and water-insoluble high molecular weight material at the surfaces of the oil droplets thereby forming the microcapsule walls;
   the improvement comprising said dissolving being conducted in the presence of a non-oily low boiling solvent or a non-oily polar solvent, both solvents being different from said oily hydrophobic liquid, said non-oily low boiling solvent or said non-oily polar solvent being released into the water which forms the continuous phase of the dispersion during said step (3) resulting in the formation of said oil- and water-insoluble high molecular weight material microcapsule walls;
   wherein said non-oily low boiling solvent is a solvent for said film-forming materials, is miscible with said oily hydrophobic liquid, and is not water;
   wherein said non-oily polar solvent is a solvent for said film-forming materials, is miscible with said oily hydrophobic liquid, is soluble in water, and is not water; and
   wherein said oily hydrophobic liquid is immiscible with water.

16. The process as in claim 15 wherein said oily hydrophobic liquid is a natural oil, a synthetic oil or a solvent having a mild or high boiling point.

17. The process as in claim 15 wherein said oily hydrophobic liquid is paraffin oil, cotton seed oil, soybean oil, corn oil, olive oil, castor oil, fish oil, lard oil, chlorinated paraffin, chlorinated diphenyl, dibutyl phthalate, dioctyl phthalate, tributyl phosphate, tricresyl phosphate, dibutyl maleate, o-dichlorobenzene or benzyl alcohol; wherein said non-oily low-boiling solvent is n-pentane, methylene chloride, ethylene chloride, carbon disulfide, acetone, methyl acetate, chloroform, methyl alcohol, tetrahydrofuran, n-hexane, carbon tetrachloride, ethyl acetate, ethyl alcohol, methyl ethyl ketone, benzene, ethyl ether, petroleum ether or mixtures thereof; and wherein said non-oily polar solvent is dioxane, cyclohexanone, methyl isobutyl ketone or dimethyl formamide.

18. The process as in claim 15 wherein said polyisocyanates are di-, tri-, tetra-, or polyisocyanates; wherein said polyamines are aromatic or aliphatic polyamines; wherein said polycarboxylic acid is pimelic acid, suberic acid, azelaic acid, sebacic acid, phthalic acid, terephthalic acid, 4,4′-biphenyl-dicarboxylic acid or 4,4′-sulfonyldibenzoic acid; wherein said polybasic acid chloride is terephthalic acid chloride, 1,5-naphthoic acid chloride, 4,4′-phthalic acid chloride, 1,5-naphthoic acid chloride, 4,4′-biphenyldicarboxylic acid chloride or 4,4-oxydibenzoic acid chloride; wherein said acid anhydride is a dehydration condensate of two carboxylic acid or dicarboxylic acid molecules; wherein the epoxy compounds are aliphatic or aromatic glycidyl ethers, aliphatic glycidyl esters or glycidyl ether-ester mixtures; wherein the polyols are aliphatic or aromatic polyhydric alcohols, hydroxypolyesters, polythiols or hydroxypolyalkylene ethers; wherein the acrylate compounds are cyano-acrylates or polyester acrylates; wherein the polysulfide is a reaction product of a dihalide and sodium sulfide; wherein the lactone is bis-α-angelica lactone; and wherein the lactam is ε-caprolactam or η-capryl lactam.

19. The process as in claim 18 wherein said first film-forming material is a polyisocyanate, a polyisothiocyanate or a prepolymer thereof, and wherein the second film-forming material is a polyol, a polyamine, a polythiol, an acid anhydride or an epoxy compound.

20. The process as in claim 18 wherein said first film-forming material is a polyamine and wherein said second film-forming material is a polycarboxylic acid, a polybasic acid, chloride, an epoxy compound, a polyisocyanate or a hydroxy polyester.

21. The process as in claim 18 wherein said first film-forming material is a polycarboxylic acid and wherein said second film-forming material is a polyisocyanate, a pre-polymer thereof, a polyisothiocyanate, a pre-polymer thereof, a polyamine, a polythiol or a polyhydric alcohol.

22. The process as in claim 18 wherein said first film-forming material is a polybasic acid chloride and wherein said second film-forming material is a polyamine or a polyol.

23. The process as in claim 18 wherein said first film-forming material is an acid anhydride and wherein said second film-forming material is a polyisocyanate, a pre-polymer thereof, a polyisothiocyanate, a pre-polymer thereof, a polyamine or an epoxy compound.

24. The process as in claim 18 wherein said first film-forming material is an epoxy compound and wherein said second film-forming material is a polyamide, a polyisocyanate, a pre-polymer thereof, a polyisothiocyanate, a pre-polymer thereof, a polysulfide, an acid anhydride or a polycarboxylic acid.

25. The process as in claim 18 wherein said first film-forming material is a polyol and wherein said second film-forming material is a polythiol, a polyisocyanate, a pre-polymer thereof, a polyisothiocyanate, a pre-polymer thereof, a polycarboxylic acid, an acid anhydride or a polybasic acid chloride.

26. The process as in claim 18 wherein said first film-forming material is a lactone or a lactam and wherein said second film-forming material is a polyisocyanate, a pre-polymer thereof, a polyisothiocyanate, a pre-polymer thereof or a polyamide.

References Cited
UNITED STATES PATENTS
| | | | |
|---|---|---|---|
| 2,969,330 | 1/1961 | Brynko | 252—316 |
| 3,270,100 | 8/1966 | Jolkovski et al. | 252—316 X |
| 3,141,792 | 7/1964 | Lachman et al. | 117—100 A X |

FOREIGN PATENTS
| | | | |
|---|---|---|---|
| 1,091,076 | 11/1967 | Great Britain | 252—316 |
| 1,091,078 | 11/1967 | Great Britain | 252—316 |

RICHARD D. LOVERING, Primary Examiner

U.S. Cl. X.R.

117—100 A; 252—314, 364; 264—4